US010718630B2

(12) United States Patent
Rahbari Asr et al.

(10) Patent No.: US 10,718,630 B2
(45) Date of Patent: Jul. 21, 2020

(54) ELECTRIC VEHICLE CLOUD-BASED OPTIMAL CHARGE ROUTE ESTIMATION

(71) Applicant: FORD GLOBAL TECHNOLOGIES, LLC, Dearborn, MI (US)

(72) Inventors: Navid Rahbari Asr, Livonia, MI (US); Jeffery R. Grimes, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 15/835,912

(22) Filed: Dec. 8, 2017

(65) Prior Publication Data
US 2019/0178678 A1    Jun. 13, 2019

(51) Int. Cl.
| G01C 21/36 | (2006.01) |
| G01C 21/34 | (2006.01) |
| B60W 20/12 | (2016.01) |
| B60L 58/12 | (2019.01) |
| B60L 53/66 | (2019.01) |
| B60L 53/68 | (2019.01) |

(52) U.S. Cl.
CPC .......... *G01C 21/3697* (2013.01); *B60L 53/66* (2019.02); *B60L 53/68* (2019.02); *B60L 58/12* (2019.02); *B60W 20/12* (2016.01); *G01C 21/3469* (2013.01); *B60L 2240/622* (2013.01); *B60L 2240/70* (2013.01); *B60L 2240/72* (2013.01); *B60L 2260/52* (2013.01); *B60L 2260/54* (2013.01); *B60W 2510/244* (2013.01); *B60W 2556/50* (2020.02)

(58) Field of Classification Search
CPC .......... G01C 21/3697; G01C 21/3469; B60W 20/12; B60W 2556/50; B60W 2510/244; B60L 53/68; B60L 53/66; B60L 58/12; B60L 2260/52; B60L 2260/54; B60L 2240/70; B60L 2240/72; B60L 2240/622
See application file for complete search history.

(56) References Cited

U.S. PATENT DOCUMENTS

| 8,798,830 | B2 | 8/2014 | Sobue et al. |
| 9,469,213 | B2 * | 10/2016 | Zhao ............... B60L 11/1862 |
| 9,522,669 | B2 * | 12/2016 | Engman ............... B60L 1/00 |
| 2014/0172282 | A1 | 6/2014 | Feng et al. |
| 2017/0190259 | A1 | 7/2017 | Penilla et al. |

* cited by examiner

*Primary Examiner* — Russell Frejd
(74) *Attorney, Agent, or Firm* — David B. Kelley; Brooks Kushman P.C.

(57) ABSTRACT

A hybrid electric vehicle (HEV) that includes a communication unit configured to periodically respond to a charge signal, and to adjust a travel route and charge waypoint, according to an estimated charge station travel route and waypoint charge time received from a remote fleet server. The estimates are received in response to periodic operating conditions that are generated and communicated to the server. The operating conditions include one or more of charge station, environment, and location data, vehicle data, and battery performance data, among other data. The controller further configured to respond to travel route and/or charge complete signals, and to generate and store an estimate error as a difference between the actual and estimated optimal charge route and charge time. The controller readjusts at least one of the travel route and charge waypoint, responsive to the updated estimated optimal charge route and waypoint charge time received from the server.

13 Claims, 2 Drawing Sheets

ELECTRIC VEHICLE CLOUD-BASED OPTIMAL CHARGE ROUTE ESTIMATION

TECHNICAL FIELD

The disclosure relates to estimating optimized routes to high power charge stations for electric vehicles, utilizing remote server data analytics generated from real-time trip routing and vehicle performance data that is accumulated from global vehicle fleets.

BACKGROUND

In electric and hybrid electric vehicles (HEVs), long and short distance travel or trips can be unnecessarily costly, and can be extended and/or delayed by the need for recharging of batteries. With the gradual increase in high power and more efficient road side charge stations, such travel time and costs may be reduced, so long as HEVs can be optimally routed to the most efficient, least expensive, and most readily available road side charging stations. Charge performance of HEVs and charge stations is affected by the ambient environment, vehicle performance, charging station capabilities and efficiency, availability due to use and maintenance issues, cost of electricity, and other factors, which can introduce undesirable errors in travel route planning and charge time estimates across such planned routes. In view of the stochastic nature of ever changing charge station locations, efficiency, availability, and costs, such travel planning and charge time estimate errors have persisted despite some attempts to improve accuracy.

Some such attempts have been directed to predicting HEV range of operation estimates, predicting optimal charge station locations, and/or predicting real-time HEV performance. Such attempts appear to have utilized known HEV and charge station performance and look-up table algorithms, which seem to have been employed in different ways with controllers located on board the HEVs. With the vastly increasing number of variables and parameters that define the continuously changing performance of HEVs across a global fleet, and the location and efficiency of charge stations, the capability to accurately estimate optimized routes to high power charge stations has substantially exceeded the technological capability of such on-board HEV processors.

SUMMARY

Hybrid, plug-in hybrid, and battery electric vehicles (HEVs, PHEVs, BEVs) include navigation systems and a high voltage traction battery or batteries, which are utilized with other HEV systems to enable travel over routes of varying distances. The disclosure is directed to improved systems and methods for more accurately estimating optimized travel routes to have waypoints that include high power charging stations, such that HEV performance over such travel routes can be maximized with minimum travel and battery recharge times due to utilization of such high power charging stations.

HEVs according to the disclosure, use, among other capabilities, a communication capability with a cloud-based, neural network, remote, fleet server system. The remote fleet server is utilized by the HEVs to off-load analytical and estimation computing resources and capabilities that are needed for determining, estimating, and/or predicting optimal charge station travel routes and/or charge waypoint and time estimates, for charging stations that are automatically detected and selected as waypoints along such travel routes. Such charge waypoints and charge waypoint charge time estimates or optimal charge routes are generated by the remote fleet server and include the ever-changing locations and capabilities of fast, least cost, high power, and/or high-efficiency charging stations along and/or proximate to the travel route of the HEV.

The new remote server system receives and aggregates HEV battery and vehicle performance data from a global fleet of operating HEVs, as well as continuously updated, high power charging station location, capability, availability, and performance data. The cloud-based, neural network remote server system is configured to ingest and digest this data, and to discover and utilize otherwise unknown patterns in the HEV optimal charge route and battery charge performance to more accurately predict more efficient high power charge stations as waypoints, and waypoint charge time estimates for any individual HEV. In this way, the remote server communicates continuously updated and more accurate estimates of such optimal charge route and charge waypoints and times to individual HEVs, in response to charge signals and operating conditions received from the global fleet of operating HEVs.

The disclosure contemplates the optimal charge routes and battery charge estimates being generated by the remote server utilized real-time HEV data. The remote server utilizes aggregated "big data" describing actual charging station performance, vehicle performance data, and battery performance and driver behavior, which is analyzed by the remote, cloud server-based, deep-learning neural network engine and/or engines that is/are trained to discover otherwise unrecognizable patterns. The remote server engine(s) predict/estimate optimal travel routes, charge waypoints, and/or waypoint charge times for individual HEVs, upon demand for any individual HEV in communication with the server, with continuously updated data and improved accuracy.

In operation, HEVs operating in a global fleet, transmit location, environmental conditions, vehicle performance data, battery performance data, and charging station performance data, in real time to the remote server. The remote server retains route and recharge/charge-event data from the global EV fleet. The received and aggregated data is analyzed with the deep learning neural network to discover the hidden patterns between the data and the estimated and/or predicted and actual charge station travel routes and charge waypoints and times. The neural network is trained to estimate and/or predict upon demand from individual HEVs, the optimal travel routes to high power charge stations, generated as waypoints along the travel route and/or the recharge times for the individual HEVs, which estimated and/or predicted routes and/or waypoints and charge times may be periodically updated and communicated to the individual HEVs in real-time and upon demand during travel and/or recharge/charge events, to improve travel route optimization and/or charge waypoints and time estimates/predictions.

In configurations and methods of operation of the disclosure, an HEV/PHEV/BEV (hereafter referred to collectively as an "HEV") incorporates a controller that is, or controllers that are, coupled to at least one battery and a communication unit, which are configured to periodically monitor for and to respond to a charge signal from the HEV that indicates a charge/recharge event has commenced and/or will soon be required over the course of navigating to each of various waypoints of a current travel route. The periodic monitoring and responses may be configured to occur at discrete time and/or distance intervals, and/or when certain HEV, charging station, and/or travel route parameters change beyond predetermined and/or preferred thresholds.

The controller(s) adjust a travel route and/or charge time, according to an estimated or predicted optimal charge route and/or charge waypoint, which estimates/predictions are received from the remote fleet server. The remote fleet server generates and sends the optimized, estimated, and/or predicted optimal charge route and/or charge waypoints and times in response to an operating condition generated and communicated to the remote global fleet server by the HEV controller(s) and communication unit. The operation condition(s) include(s) various local HEV travel route and charging station data, such as at least one of and/or one or more of travel route weather and HEV performance over the travel route, and charge station, environment, and location data, vehicle performance data, and related performance data and parameters, among other data.

In further variations, the controller(s) are also further configured to respond to at least of a travel route and/or charge complete signal, which indicates one or more of a travel route being completed and/or recharging of the HEV battery(ies) is/are complete. In response, the controller(s) generate and store, and communicate to the remote server, an estimate error that is calculated as a difference between the previously received, estimated optimal charge route and/or charge waypoint and time, and an actual travel route performance and/or charge time, which are established when the travel route and/or recharging is/are complete, and when the travel route and/or charge complete signal(s) is/are generated. The estimate error is also communicated to the remote cloud-based global fleet server to enable the remote global fleet server neural network big-data learning engines to improve prospective estimates and/or predictions of optimized optimal charge routes and/or charge waypoint and time, according the various data and performance parameters accumulated during the current travel route and/or charge/recharge events.

In other modifications, the controller(s) are also configured to periodically and/or at the discrete time and/or distance intervals, readjust the respective travel routes and/or charge waypoints, according to an updated optimized optimal charge route and/or waypoint charge time prediction and/or estimate, which is/are received by the communication unit from the remote global fleet server. The remote fleet server sends the updated optimal charge route and/or charge waypoint and time estimates in response to and when the HEV controller(s) generate(s) and send(s) a new real-time operating condition, which also may include the estimate error. Such operating conditions and vehicle performance data may also further include vehicle identification number (VIN) and onboard diagnostic (OBD) codes and data, travel route performance data, vehicle power, and related parameters and data, among other data.

Additionally, the operating conditions may include battery performance data and parameters may also include battery pack capacity and chemistry, battery state of health and charge, battery temperature, charge station availability and power and performance, and low voltage battery status, among other data. The charge station data sent by one or more of the global HEVs and/or charging stations to the remote global fleet server, may also include charge station power cost and capacity data, utilization and availability, and charge station performance data generated and accumulated during the current HEV charge event. Such charge station data may be sent in real-time, and only during the discrete time intervals, and/or during intervals when various parameters and charging station data change.

The disclosure contemplates the controller(s) further being configured to readjust the HEV travel route and/or charge waypoint and time, according to an initially determined and estimated travel route to a charge station and/or charge time that may be initially estimated when the vehicle is connected to a charge station power source, and which may also be generated and received from the remote fleet server, in response to new operating conditions generated and communicated to the server by the HEV controller(s), and which may include the initially estimated and determined travel route and/or charge waypoints and times.

The disclosure also includes methods of controlling the individual HEVs of the global fleet, utilizing the described capabilities and improvements. For example, the methods include adjusting, by the controller(s), coupled to the battery and the communication unit, and periodically in response to a charge signal, the travel route and/or charge waypoint and time. The adjusting is accomplished by the controller(s) according to the optimal charge route and/or charge waypoints and time estimates/predictions generated by and received from the remote fleet server. Adjusting the travel route and/or charge waypoints and times is also accomplished in response to operating conditions generated periodically by the HEV controllers and/or at discrete time and/or distance internals, and communicated to the remote server. The operating conditions include one or more of travel route performance, and/or charge station, environment, and location data, vehicle performance data, and battery performance data and parameters, among other data and parameters.

Optimization of the travel route and/or recharging of the HEV batteries is/are also controlled in response to the travel route and/or charge complete signals, with the controller(s) generating and storing the estimate error as the difference between the estimated optimal charge route and performance and/or the charge waypoint and time, and the actual travel route performance and/or waypoint charge time. Readjusting the charge waypoint and time and travel route is also accomplished by the controller(s) according to the updated estimated optimal charge route and/or waypoint charge time received by the communication unit from the remote global fleet server, which is also done in response to the operating conditions that also include the estimate error, generated by the HEV controllers, and which are communicated to the remote global fleet server.

The disclosure also contemplates generating, by the HEV controller(s), the operating conditions to include: environment and location data to incorporate geographic location, and ambient temperature, humidity, and atmospheric pressure, vehicle performance data to incorporate vehicle identification number and onboard diagnostic codes and data, vehicle power, and battery performance data and parameters to include battery pack capacity and chemistry, battery state of health and charge, battery temperature, charge station power and performance, and low voltage battery status, among other parameters and data.

These methods also may include readjusting, by the controller, the travel route and/or charge waypoint and time, according to an updated estimated optimal charge route and/or waypoint charge time received by the communication unit from the remote fleet server, and in response to the operating conditions generated and communicated to the remote server, and the operating conditions including charge station data to include power cost and capacity and availability data, and charge station performance data accumulated during a discrete time interval, as well as during the current charge event.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
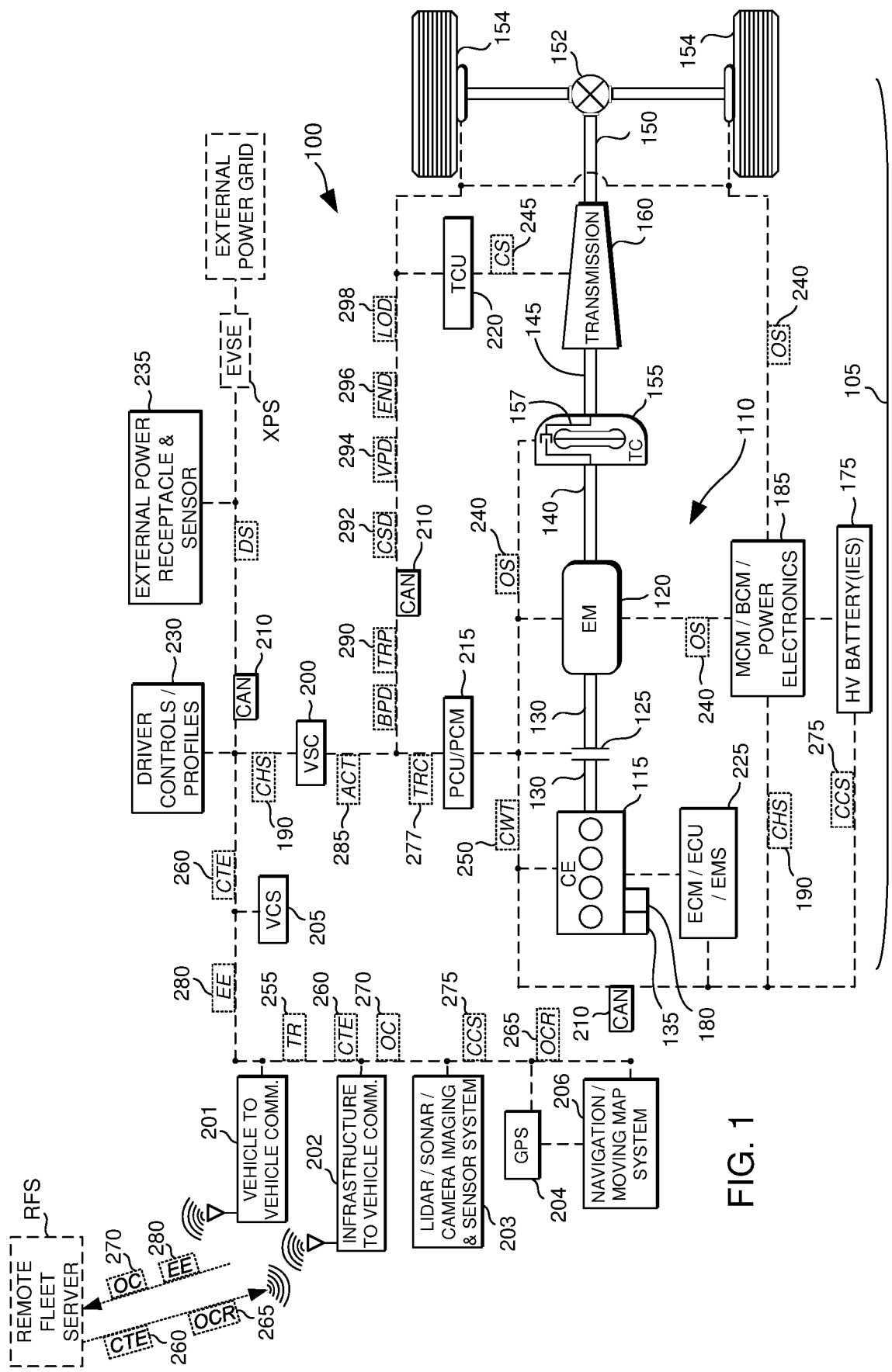
FIG. 1 is an illustration of a hybrid electric vehicle and its systems, components, sensors, actuators, and methods of operation.
Figure 2:
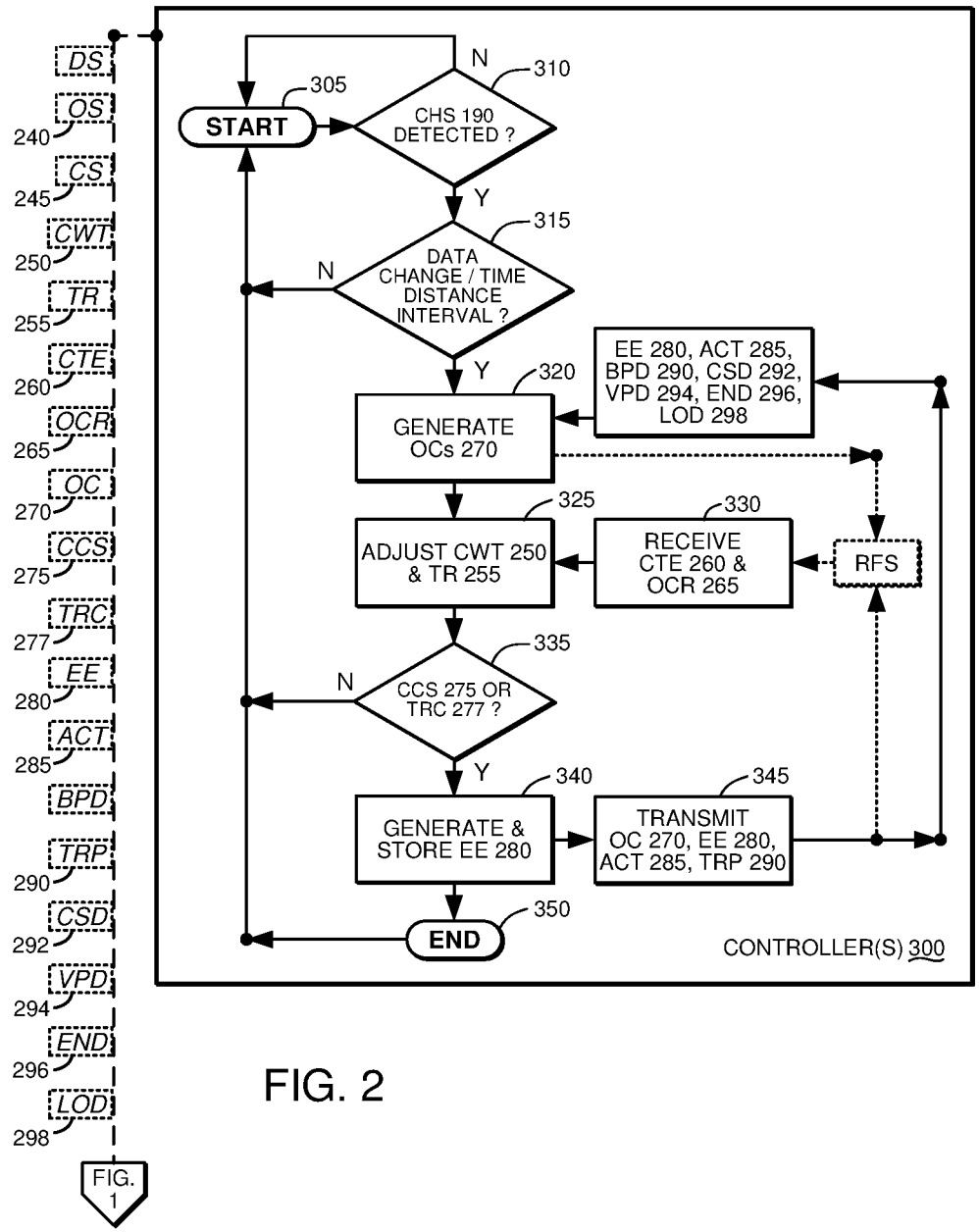
FIG. 2 illustrates certain aspects of the disclosure depicted in FIG. 1, with components removed and rearranged for purposes of illustration.

With reference now to the various figures and illustrations and to FIGS. 1 and 2, and specifically to FIG. 1, a schematic diagram of a hybrid electric vehicle (HEV) 100 is shown, and illustrates representative relationships among components of HEV 100, which can also be a battery electric vehicle (BEV), a plug-in hybrid electric vehicle (PHEV), and combinations and modifications thereof, which are herein collectively referred to as an "HEV". Physical placement and orientation of the components within vehicle 100 may vary. Vehicle 100 includes a driveline 105 that has a powertrain 110, which includes a combustion engine (CE) 115 and an electric machine or electric motor/generator/starter (EM) 120, which generate power and torque to propel vehicle 100. Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices (FEADs) described elsewhere herein. CE 115 is coupled to electric machine or EM 120 with a disconnect clutch 125. CE 115 generates such power and associated engine output torque for transmission to EM 120 when disconnect clutch 125 is at least partially engaged.

EM 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to EM 120 to enable operation as an electric generator, and to other components of vehicle 100. Similarly, EM 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, EM or electric machine 120 may assist engine 115 in a "hybrid electric mode" or an "electric assist mode" by transmitting additional power and torque to turn drive shafts 130 and 140. Also, EM 120 may operate in an electric only mode wherein engine 115 is decoupled by disconnect clutch 125 and which may be shut down, enabling EM 120 to transmit positive or negative (reverse) mechanical torque to EM drive shaft 140 in forward and reverse directions. When in a generator mode, EM 120 may also be commanded to produce negative electrical torque (when being driven by CE 115 or other drivetrain elements) and to thereby generate electricity for charging batteries and powering vehicle electrical systems, and while CE 115 is generating propulsion power for vehicle 100. EM 120 also may enable regenerative braking when in generator mode by converting rotational, kinetic energy from powertrain 110 and/or wheels 154 during deceleration, into negative electrical torque, and into regenerated electrical energy for storage, in one or more batteries 175, 180, as described in more detail below.

Disconnect clutch 125 may be disengaged to enable engine 115 to stop or to run independently for powering engine accessories, while EM 120 generates drive power and torque to propel vehicle 100 via EM drive shaft 140, torque convertor drive shaft 145, and transmission output drive shaft 150. In other arrangements, both engine 115 and EM 120 may operate with disconnect clutch 125 fully or partially engaged to cooperatively propel vehicle 100 through drive shafts 130, 140, 150, differential 152, and wheels 154. Each or any such components may also be combined in part and/or entirely in a comparable transaxle configuration (not shown). Driveline 105 may be further modified to enable regenerative braking from one or any or all wheel(s) 154, using a selectable and/or controllable differential torque capability. Although FIG. 1 schematically depicts two wheels 154, the disclosure contemplates driveline 105 to include additional wheels 154.

The schematic of FIG. 1 also contemplates alternative configurations with more than one engine 115 and/or EM 120, which may be offset from drive shafts 130, 140, and where one or more of engines 115 and EMs 120 are positioned in series and/or in parallel elsewhere in driveline 105, such as between or as part of a torque convertor and a transmission, and/or a transaxle, off-axis from the drive shafts, and/or elsewhere and in other arrangements. Still other variations are contemplated without deviating from the scope of the present disclosure. Driveline 105 and powertrain 110 also include a transmission that includes a torque convertor (TC) 155, which couples engine 115 and EM 120 of powertrain 110 with and/or to a transmission 160. TC 155 may further incorporate a bypass clutch and clutch lock 157 that may also operate as a launch clutch, to enable further control and conditioning of the power and torque transmitted from powertrain 110 to other components of vehicle 100.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, EM 120, and vehicle 100, as depicted in FIG. 1, through various mechanical and electrical interfaces and vehicle controllers, as described elsewhere herein. High voltage EM battery 175 is also coupled to EM 120 by one or more of a motor control module (MCM), a battery control module (BCM), and/or power electronics 185, which are configured to convert and condition direct current (DC) power provided by high voltage (HV) battery 175 for EM 120.

MCM/BCM/power electronics 185 are also configured to condition, invert, and transform DC battery power into three phase alternating current (AC) as is typically required to power electric machine or EM 120. MCM/BCM 185/power electronics is also configured to charge one or more batteries 175, 180 with energy generated by EM 120 and/or front end accessory drive components, and to receive, store, and supply power from and to other vehicle components as needed. Such controllers, including for example, those incorporated with power electronics 185 are configured to monitor battery sensors to detect voltage, current, state-of-charge (SoC), charge the battery(ies), to adjust and control a charge-rate and charge-time therefor, to monitor and estimate charge time, to monitor recharging, and to discharge and deliver power from the battery(ies), among other capabilities.

With continued reference to FIG. 1, vehicle 100 further includes one or more controllers and computing modules and systems, in addition to MCM/BCM/power electronics 185, which enable a variety of vehicle capabilities. For example, vehicle 100 may incorporate a vehicle system controller (VSC) 200 and a vehicle computing system (VCS) and controller 205, which are in communication with MCM/BCM 185, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

Such CANs 210 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/430.040.15/x/.

With attention invited again to FIG. 1, vehicle 100 also may include VCS 205 to be the SYNC onboard vehicle computing system manufactured by the Ford Motor Company (See, for example, SmartDeviceLink.com, www.ford.com, U.S. Pat. Nos. 9,080,668, 9,042,824, 9,092,309, 9,141,583, 9,141,583, 9,680,934, and others). Vehicle 100 also may include a powertrain control unit/module (PCU/PCM) 215 coupled to VSC 200 or another controller, and coupled to CAN 210 and engine 115, EM 120, and TC 155 to control each powertrain component. A transmission control unit may also be coupled to VSC 200 and other controllers via CAN 210, and is coupled to transmission 160 and also optionally to TC 155, to enable operational control.

VCS 205 may include, be configured with, and/or cooperate with one or more communications, navigation, and other systems, units, controllers, and/or sensors, such as a vehicle to vehicle communications system (V2V) 201, and roadway and cloud-based network infrastructure to vehicle communication system (I2V) 202, a LIDAR/SONAR (light and/or sound detection and ranging) and/or video camera roadway proximity imaging and obstacle sensor system 203, a GPS or global positioning system 204, and a navigation and moving map display and sensor system 206.

Such communications systems, units, controllers, may be configured with, as, and be part of other communications units and enable bidirectional communications by wired and wireless communications that may include cellular, wireless ethernet and access points such as WiFi™ wireless capabilities, near field communications such as Bluetooth™, and many others. The VCS 205 can cooperate in parallel, in series, and distributively with VSC 200 and other controllers to manage and control HEV 100 and such other controllers, and/or actuators, in response to sensor and communication signals, data, parameters, and other information identified, established by, communicated to, and received from these vehicle systems, controllers, and components, as well as other systems external and/or remote to HEV 100.

While illustrated here for purposes of example, as discrete, individual controllers, MCM/BCM 185, VSC 200 and VCS 205 may control, be controlled by, communicate signals to and from, and exchange data with other controllers, and other sensors, actuators, signals, and components that are part of the larger vehicle and control systems, external control systems, and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, MCM/BCM 185, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, HEV 100 also may include a powertrain control unit/module (PCU/PCM) 215 coupled to VSC 200 or another controller, and coupled to CAN 210 and engine 115, EM 120, and TC 155 to control each powertrain component. A transmission control unit (TCU) 220 is also coupled to VSC 200 and other controllers via CAN 210, and is coupled to transmission 160 and also optionally to TC 155, to enable operational control. Engine control module (ECM) or unit (ECU) or energy management system (EMS) 225 may also be included having respectively integrated controllers and be in communication with CAN 210, and is coupled to engine 115 and VSC 200 in cooperation with PCU 215 and TCU 220 and other controllers.

In this arrangement, VSC 200 and VCS 205 cooperatively manage and control the vehicle components and other controllers, sensors, and actuators, including for example without limitation, PCU 215, TCU 220, MCM/BCM 185, and/or ECU/EMS 225, among various others. For example, the controllers may communicate control commands, logic, and instructions and code, data, information, and signals to and/or from engine 115, disconnect clutch 125, EM 120, TC 155, transmission 160, batteries 175, 180, and MCM/BCM/power electronics 185, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers. Such control commands, logic, and instructions and code, data, information, signals, settings, and parameters, including driver preferred settings and preferences, may be captured and stored in, and communicated from a repository of driver controls and profiles 230.

For further example, various other vehicle functions, actuators, and components may be controlled by the controllers within and in cooperation with HEV 100 systems and components, and may receive signals from other controllers, sensors, and actuators, which may include, for purposes of illustration but not limitation, front-end accessory drive (FEAD) components and various sensors for battery charging or discharging, including sensors for detecting and/or determining the maximum charge, charge-state or state-of-charge (SoC), voltage and current, battery chemistry and life-cycle parameters, and discharge power limits, external environment ambient air temperature (TMP), pressure, humidity, and component temperatures, voltages, currents, and battery discharge power and rate limits, and other components. Such sensors are configured to communicate with the controllers and CAN 210 and may, for further example, establish or indicate ignition switch position (IGN), external environment temperature and pressure, engine and thermal management system sensors, charge receptacle sensors, and external power source voltage, current, and related data communications sensors, among others.

HEV 100 also includes at least one external power source receptacle and sensor 235, which is coupled with the various controllers, including for example BCM/MCM/power electronics 185 and HV battery 175. Receptacle 235 is utilized when HEV 100 is stationary and parked adjacent to an external power source (XPS) (FIG. 1), such as in a home, office, or other electrical power charging station or location, which stations are also known to those knowledgeable in the technology as electric vehicle supply equipment (EVSE). These controllers are configured to detect the presence of XPS when it is connected to receptacle 235, and to initiate a charging/recharging cycle or event of HV battery 175, battery 180, as well as enabling power to be supplied to HEV 100 for various purposes.

Such controllers may also enable bidirectional communication between HEV 100 and external XPS/EVSE to establish power capacity, cost of power, power use authorization, compatibility, and other parameters and information about and from the external XPS. Such communications between HEV 100 and external XPS may enable automated charging, purchase of power for a period of time, and may enable communication between external XPS and VSC 200 and VCS 205, as well as communication with remote systems external to HEV 100 and its various controllers. This configuration may further enable an occupant of HEV 100 to interact to convey power purchase authorization via a display in HEV 100. Additionally, HEV 100 may autonomously interact with both external XPS and one or more of VSC 200 and VCS 205 to communicate information to enable automated charging of HEV 100, and estimating of charge time, and communications of various vehicle and systems data and parameters to such external systems.

To enable charging of the HV battery(ies) 175 and/or other batteries, one or more of the controllers, such as those included with BCM/MCM/power electronics 185 are configured to detect external XPS being connected to receptacle 235, and to generate and communicate an external-power signal or direct-current charge-signal (DS), which may include earlier described information indicating connection to XPS, power available from XPS, cost of such power, compatibility data, and use-authorization and authentication data, and related information. In response, the power electronics 185 and/or other controllers initiate charging at a charge-rate of the battery(ies) 175, 180 or others.

Typically, the charge-rate and charge-time are initially estimated and determined when HEV 100 is initially connected to and/or plugged into XPS/EVSE. Additionally, the charge time is also initially determined during operation, and when HEV 100 detects a prospective need for recharging of batteries, and generates charge signal CHS 190. Such initial estimates and determinations are a function of the EVSE and power grid capabilities, costs, and availability, as well as various parameters of HEV 100, including for example the current state-of-charge (SoC) of the respective battery(ies) 175. Both the initially estimated and determined charge-rate and the charge-time may be automatically changed by the controllers during charging operations and during normal use as possible life-cycle and performance changes occur in charge capacity and power transfer capability, which the controllers may detect in battery 175 and power electronics 185, and which RFS may estimate remotely for the global fleet of HEVs 100, as well as for the individual HEV 100.

As described and illustrated in the various figures, including FIGS. 1 and 2, the signals and data, including for example, external-power signal DS, and related control logic and executable instructions and other signals, and data can also include other signals (OS) 240, and control or command signals (CS) 245 received from and sent to and between controllers and vehicle components and systems. The external-power signal DS, OS 240, and CS 245, and other signals, related control logic and executable instructions, parameters, and data can and/or may be predicted, generated, established, received, communicated, to, from, and between any of the vehicle controllers, sensors, actuators, components, and internal, externals, and remote systems. Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIGS. 1 and 2, and by flow charts or similar diagrams as exemplified in the methods of the disclosure illustrated specifically in FIG. 2. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof. The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

With continuing reference to the various figures, including FIG. 1 the disclosure contemplates HEV 100 including at least one and/or one or more of the controller(s) coupled to the battery(ies) 175, 180, which controller(s) may be any of VSC 200, VCS 205, PCU 215, TCU 220, MCM/BCM 185, and/or ECU/EMS 225, and a communication unit or units, such as VSC 200, V2V 201, I2V 202, and/or VCS 205, any of which controllers are also configured to generate and communicate the charge signal (CHS) 190, which identifies a requirement for recharging of batteries 175 of HEV 100. In response to CHS 190, the controller(s) adjust a charge waypoint and time (CWT) 250 and a travel route (TR) 255 and waypoints thereof, according to a charge time estimate (CTE) 260 and an estimated optimal charge route (OCR) 265, which are both received from a remote, off-board global fleet server (RFS) that is external and remote to HEV 100.

Such communications between the controller(s) of HEV 100 and RFS is and/or may be enabled via EVSE/XPS, and by other communications paths, connections, and/or capabilities, which include for example without limitation, the contemplated cellular, WiFi, Bluetooth, near field, and/or mobile or nomadic communications devices that may be positioned or located in a passenger cabin of HEV 100, and connected with the controller(s) such as the SYNC system described elsewhere herein. The adjusted CWT 250 and/or TR 255 may be communicated and displayed to a driver in cooperation with VCS 205 or another of the controller(s) or communication unit(s) that enables display of the adjusted CWT 250 and/or TR 255 within the cabin of HEV 100 and/or via the mobile or nomadic devices, or other mobile communications devices.

CWT 250 establishes which charge station and/or charge waypoint is recommended for use and how much time remains to complete the required charge/recharge event, and is initially calculated by the controller(s) of HEV 100 as a function of, among other data and information, an operating condition (OC) 270. OC 270 includes, for example, one or more of TR 255, charge station (XPS, EVSE) data, environment data, and location data, vehicle performance data (VPD) 294 such as current power and cooling demands, and battery performance data and parameters, as well as instantaneous vehicle operating parameters and data.

Such parameters and data are generated, stored, and communicated by the respective vehicle controller(s) as described elsewhere herein, and also may be stored locally in HEV 100 in profiles repository 230. An initially determined CWT 250 and subsequently adjusted CWTs 250 may be time stamped and stored in and as adjustments to VPD 294, as the charge station and battery performance data, for each charge/recharge event, along with the other noted data and parameters (for example, voltages, currents, charge rates, temperatures, etc.) that may be utilized to generate CWT 250.

For further examples, VPD 294 may also include various battery charge/recharge profiles that may establish voltage, current, charge rates, and discharge rates, minimum and maximum limits for SoCs under various operating conditions and environmental circumstances, and battery state of health, any and all of which may change as lifecycle charge/recharge events accumulate. Also, VPD 294 may include such established rates for various types of home, public, and/or commercial charge stations XPS, EVSE, and may also include authentication, authorization, and/or payment data needed to enable automated, unattended, and/or manually initiated/operated charging events.

In further examples, VPD 294 may also include HEV 100 power demands during such contemplated charge/recharge events to cool various components, as well as other HEV 100 power demands that may be driver initiated (for example, cabin cooling, media system use, interior lighting, etc.). VPD 294 and other data, information, settings, and parameters, may be stored in, and communicated from the driver controls and profiles repository 230.

TR 255 is generated initially by a vehicle user and/or automatically by the controller(s) of HEV 100 to include various travel route waypoints that include charge station waypoints, in response to a current position and predicted destination that may be derived from prior trips and a current trajectory of HEV 100. In either instance, TR 255 includes a starting waypoint and a destination waypoint, and may include various navigational and charge station waypoints therebetween. TR 255 may be configured automatically or by a vehicle user utilizing VCS 205 (for example Ford's SYNC system), navigation and moving map system 206, and/or other vehicle controller(s), and further enables various related capabilities that in variations include manually selected, automatically selected, and/or automatically recommended and/or suggested waypoints that include charging stations and/or high power, high efficiency charging stations, as such waypoints, among other types of intermediate travel route waypoints.

CTE 260 is received from RFS in response to OC 270 generated and communicated to RFS by the vehicle controller(s). CTEs 260 and OCRs 265 may also be time stamped and stored in VPD 294 for each charge/recharge event. CTE 260 identifies an estimate of how much time remains to complete the required charge/recharge event, which is established for the HEV 100 individually by RFS, but as a function of accumulated and aggregated data and parameters received by cloud-based RFS from a global fleet of similar and/or identical HEVs 100.

OCR 265 is also received from RFS in response to OC 270, and includes recommended updates to TR 255 that may include newly identified high power and high efficiency charging stations proximate to a current location of HEV 100 and/or proximate to the trajectory and waypoints established by the current TR 255. RFS may utilize OC 270 received from each individual HEV 100 to identify improvements to TR 255 by way of updated CWTs 250 and CTEs 260, which may account for weather and road conditions along TR 255 not otherwise known to HEV 100, as well as EVSE availability, efficiency, and/or current conditions reported by other HEVs 100 that may have previously been in locations that exist along the current TR 255 of the HEV 100 reporting OC 270.

The RFS includes remote big data analytics engines and computational resources, which may utilize neural network, artificial intelligence, and other analytical technologies to discover otherwise unrecognizable patterns in rate of energy usage based on environmental factors by all HEVs in the global fleet as well as that of HEV 100 as reported by OC 270. Further, RFS is also configured to observe, digest, and predict utilization, congestion, and/or availability of high power charging stations along TR 255 as a function of data received from other vehicles. In addition, RFS is enabled to identify and predict energy costs at each charging station and/or EVSE along the waypoints and trajectory of TR 255. With each of these and other capabilities, RFS is configured with more powerful computing resources to generate, estimate, and predict more accurately each CWT 250, CTE 260, and OCR 265 that is communicated to HEV 100, in response to the received OC 270, and upon demand and in real-time.

Utilization of an off-board, RFS generated, estimated, and/or predicted CWT 250, CTE 260, and OCR 265, improves accuracy of CWT 250 and TR 255 as adjusted with updated charge station waypoints and charge times CWTs 250. Such an improvement is otherwise unavailable in view of the limited processing power, data storage, and computing resources available on-board in most HEVs 100 and the contemplated controllers. Additionally, utilization of RFS generated, predicted, and estimated CWT 250, CTE 260, and OCR 265, which are enabled with the substantially greater resources of RFS and aggregated data from a global fleet of HEVs, to adjust CWT 250 and/or TR 255 without substantial on-board processing, reduces the consumption of such limited computational power and resources of HEV 100, which are needed to enable the various indigenous systems and subsystems thereof.

During charge events, and in response to at least one and/or one or more of a charge complete signal (CCS) 275 and/or a travel route complete signal (TRC) 277, the vehicle controller(s) generate an estimate error (EE) 280. CCS 275 is generated by the vehicle controllers upon completion of a current charge event of HEV 100. TRC 277 is generated by the vehicle controllers upon completion of TR 255. Estimate error EE 280 is generated by the vehicle controllers to include multiple data elements, including a difference between CTE 260 and an actual charge time (ACT) 285, as well as a travel route performance (TRP) 290.

More specifically, CCS 275 is generated by the controllers once the SoC of battery(ies) 175, 180 reaches a predetermined maximum charge limit, and may be established by any of the data contemplated in connection with that stored in TR 255 and/or other controllers. In response to CCS 275 and EE 280, other data, parameters, settings, and information may also be updated and revised by updates received from RFS, which may also be established in view of the accumulated and aggregated global fleet data received by RFS and analyzed to identify previously unknown battery charge/recharge event lifecycle performance patterns. Similar to other signals, settings, parameters, data, and information generated by the controller(s), each of EE 280 and/or ACT 285, and others, may be time-stamped and recorded and/or stored in VPD 294 and stored in repository 230, in addition to being communicated to RFS and other systems and controllers.

TRP 290 is generated by the vehicle controllers and according to various VPD 294 and/or vehicle preferences and profiles stored in repository 230, includes one or more vehicle performance data that identifies time, energy consumed, and/or efficiency data for vehicle travel along the trajectory established by TR 255 as adjusted by OCR 265. For example, if TR 255 was established to minimize travel between the starting point and destination, and OCR 265 was utilized by vehicle controllers to periodically adjust TR 255, then TRP 290 in variations would include a time difference between the original or initial predicted or estimated time to complete TR 255 and/or the adjusted TR 255 time and/or OCR 265 estimated time to complete the trip of TR 255.

In another variation, if TR 255 and associated waypoints were initially established to minimize the energy consumed by HEV 100 between the starting waypoint and destination waypoint, then TRP 290 is modified to generate the difference between the predicted energy consumption of the original TR 255, and/or the adjusted TR 255 energy consumption and/or OCR 265 energy consumption. In either exemplary variation, whether time or energy consumption was to be minimized, the respective differences are embedded with EE 280, such that RFS can receive and analyze such error differences, and continue to improve accuracy of prospective charge waypoints CWTs 250, CTEs 260, and OCRs 265.

In variations of the disclosure, the controller(s) also will readjust CWT 250 and TR 255 upon demand and/or at periodic intervals that may be discrete time intervals, time intervals established by changing HEV 100 conditions or parameters, and/or discrete or variable distance intervals that change in response to changes in certain vehicle parameters or conditions. Such changing vehicle parameters or conditions include, in variations of the disclosure, for example without limitation, updated estimated charge station waypoints CWTs 250, CTEs 260 and/or OCRs 265 received from RFS, changes in vehicle performance and energy consumption such as additional cooling for battery(ies) 175, 180, and/or BCM 185, driver initiated power demands for cabin cooling, lighting, media system (SYNC) utilization, and other power needs, and/or new waypoints identified by the driver, among many others.

Any such varied or discrete time and/or distances intervals may be predetermined and/or automatically established by the controllers in response to HEV 100 performance characteristics, and multiple such intervals may be established and utilized for readjusting the various parameters, settings, CWT 250, and/or TR 255. Such intervals may, for example without limitation, be on the order of milliseconds, seconds, and greater units of time, as well as kilometers, miles, and/or fractions or multiples thereof, as may be suitable for use with the systems and components of HEV 100.

In other arrangements, an updated CWT 250 and CTE 260 is received from RFS by the communication units VSC 200, V2V 201, I2V 202, and/or VCS 205. Such updated CWTs 250 and CTEs 260 may, during charge events and/or during travel prior to charging, be pushed from RFS, and may also be received upon demand from HEV 100, and/or received real-time and/or periodically at the noted discrete time and distance intervals and/or as OC 270 changes. Such updated CWTs 250 and CTEs 260 enable HEV 100 to update waypoints of TR 255, which can reduce overall trip time of TR 255 and/or to reduce overall energy consumption over TR 255, if energy consumption reduction desired versus trip time.

As with other described adaptations of the disclosure, new and/or real-time OCs 270 are generated by the controller(s) and communicated to the server by vehicle communication units. Further, in some variations, original, initial, new, and/or updated OCs 270 also include, embed, encode, and/or incorporate, and communicate EE 280 and ACT 285 to RFS, which enables RFS to further improve accuracy of CWTs 250 and CTEs 260, among other capabilities. As RFS continuously improves accuracy of such CWTs 250 and CTEs 260, the vehicle controllers adjust and readjust CWT 250 such that ACTs 285 are optimized whereby the differences identified in EE 280 are optimized and/or minimized, if not even reduced to an ideal zero difference condition in certain circumstances.

In additional variations, an updated OCR 265 is received from RFS by the vehicle controllers during travel along TR 255. Such OCRs 265 may be received in response to OC 270 being communicated to RFS, upon demand by the controllers of HEV 100, and/or may be pushed from RFS to HEV 100. OCR 265 includes updated recommendations for adjustments to TR 255 that may include new or updated or change waypoints, and includes in modifications suggested changes to the waypoints of TR 255 that include previously unidentified high power and/or high efficiency charging stations as waypoints along TR 255, which are identified by RFS to meet either time or energy minimization requirements that may be established for the original or initial TR 255.

Additionally, such OCRs 265 may be updated by RFS to change or recommend new such charging stations and associated waypoints as a result of exigencies, charging station congestion or availability, environmental conditions, energy costs, and other data identified by RFS from the continuously updated data received by RFS from other HEVs in the global fleet. As RFS continuously improves accuracy of OCRs 265 generated in response to aggregated OCs 270 received from the global HEV fleet, the generated OCRs 265 result in adjusted TRs 255 for HEV 100, which optimize TRPs 290, such that EE 280 is optimized and/or minimized.

Further, in other variations of the disclosure, original, initial, new, and/or updated OCs 270 may include ACTs 285, TRPs 290, battery performance data and parameters (BPD), charge station data (CSD) 292, vehicle performance data (VPD) 294, environmental data (END) 296, and/or location data (LOD) 298, which may also be stored in, received from, and/or communicated by profiles repository 230 and/or among the other controllers, and remotely with and by RFS. ACTs 285, TRPs 290, BPD may also include any of a variety of instantaneous and/or historical vehicle performance information of from other sensors and controllers, such as for purposes of example without limitation, battery pack capacity and chemistry, energy consumption rates and totals, environmental conditions of HEV 100, battery states of health and charge (SoH, SoC), battery temperature, low voltage battery status, charging and discharging voltages and currents, and charge and discharge rates, and/or EVSE performance data, among other data.

The current and/or historical charge station data or CSD 292 for charge stations, captured and/or received by power receptacle and sensors 235 from XPS/EVSE, may further include charge station power and performance availability, charge station power cost and capacity data, and charge station performance data, among other data. Additional modifications of the disclosure include current and/or historical vehicle data or VPD 294 including a vehicle identification number (VIN), power and cooling demands, vehicle power availability and demands, cabin climate control profile, entertainment and infotainment system power consumption, onboard diagnostic (OBD) codes and data, vehicle power, and a climate control profile, among other data. Utilization of the VIN enables RFS to aggregate OCs 270 by manufacturer, vehicle make and model, and related vehicle identifiers such that RFS can further improve its analytical capabilities with respect to HEVs in the respective global fleets.

In yet other adaptations, current and/or historical environment data or END 296 from controllers that may include VSC 200, VCS 205, may include ambient temperature, humidity, and atmospheric pressure, along TR 255 and at LOD 298, among other information. Current and/or historical geographic location data or LOD 298 may be obtained from GPS 204 and navigation system 206, and included along with TR 255, among data from other controllers.

The disclosure contemplates additional modifications of the controller(s) configured to readjust CWT 250 and TR 255, according to an initially estimated and determined charge time and a recharge profile, and an initial TR 255. Such an initial CWT 250 may be and/or is a function of the current or prospective EVSE and/or charging station capabilities and current conditions of HEV 100, and which may also be and/or is received from RFS, in response to new OCs 270 generated and communicated to RFS by the controller(s) and/or communications unit(s). The initially estimated and determined CWT 250 and TR 255 may be pushed from RFS to replace stored initial, prior, and/or previous CWTs 250 and TRs 255 for all HEVs 100 in the global fleet, when such updates are determined to be advisable, such as when the analytical engines of RFS discover new patterns and performance capabilities of fleet-wide battery(ies) performance and TRs 255 from the continuously accumulated and aggregated data from each of the global fleet HEVs 100.

With continued reference to FIG. 1, and now also to FIG. 2, methods of operation of the disclosure include methods of controlling HEV 100. In view of the components, controllers, systems, and capabilities already described, such methods contemplate enabling such methods by the controller(s) designated here generally as controller(s) 300, and which may include for purposes of illustration but not for purposes of limitation, at least one of and/or one or more of controller(s) VSC 200, VCS 205, PCU 215, TCU 220, MCM/BCM 185, and/or ECU/EMS 225, as well as communication unit(s) VSC 200, V2V 201, I2V 202, and/or VCS 205.

The methods start at step 305, and at step 310 include detecting CHS 190, and at step 315 detecting vehicle data changes and/or a time and/or distance interval having elapsed, which causes at step 320 the controllers 300 to generate the OCs 270, and to communicate them to RFS. At step 325, in response to the detected CHS 190 and intervals, the controller(s) 300 adjust CWT 250 and TR 255, according to CWT 250, CTE 260, and OCR 265 received from RFS at step 330. The adjusted CWT 250 and/or TR 255 may be communicated and reported to a driver in cooperation with VCS 205 or another controller or communication unit that enables display of the adjusted CWT 250.

As with various other arrangements of the disclosure, the OCs 270 are generated in response to vehicle data changes and/or periodically and/or at discrete time and/or distance internals, and communicated to RFS. OCs 270 include at least one and/or one or more of TRP 290, BPD, CSD 292, VPD 294, END 296, and/or LOD 298, among other data and parameters. The disclosure also contemplates the methods including the adjusting CWT 250 and/or charging battery(ies) 175, 180 of HEV 100, and/or adjusting TR 255, in response to CCS 275 and TRC 277, with controller(s) 300 at step 335 detecting whether charging and travel is complete, and if not repeating the cycle of the methods and returning control to step 305. If charging and/or travel is/are complete, then at step 340 generating and storing ACT 285, TRP 290, and EE 280 to include TRP 290 and the difference between CWT 250 and/or CTE 260 and/or ACT 285. Further, such OCs 270 are generated and communicated at step 345 to RFS, and to include at least one of and/or one or more of EE 280, ACT 285, TRP 290, BPD, CSD 292, VPD 294, END 296, and/or LOD 298.

At step 350, the methods end the cycle and return control to start step 305 for continued monitoring and processing. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a controller, coupled to a communication unit, configured to
responsive to a charge signal, adjust a travel route, having an origin and final destination, to include charging at a charge waypoint along the travel route other than the origin and final destination according to an estimated optimal charge route and waypoint charge time received from a remote fleet server in response to an operating condition communicated to the remote fleet server to reduce an actual charge time,
responsive to one or more of charge and travel route complete signals, generate and store as vehicle performance data, estimate errors that include travel route performance and a difference between the actual charge time and the estimated waypoint charge time, and
responsive to a new real-time operating condition generated and communicated to the remote fleet server by the communication unit and including the estimate errors, readjust at least one of the travel route and charge waypoint according to an updated estimated optimal charge route and waypoint charge time received by the communication unit from the remote fleet server at one or more discrete time and distance intervals.

2. The vehicle according to claim 1, wherein the readjusting is further responsive to
a charge signal.

3. The vehicle according to claim 1, wherein the
new real-time operating condition include vehicle data incorporating a vehicle identification number.

4. The vehicle according to claim 1, wherein the controller is further configured to generate the operating condition to include:
vehicle environment and location data that incorporates geographic location, and ambient temperature, humidity, and atmospheric pressure,
vehicle data that incorporates vehicle identification number and onboard diagnostic codes and data, and vehicle power, and
battery performance data that includes battery pack capacity and chemistry, battery state of health and charge, battery temperature, charge station power and performance, and low voltage battery status.

5. The vehicle according to claim 1,
wherein the new real-time operating condition includes charge station data defining power cost and capacity data, and charge station performance data accumulated during a current charge event.

6. The vehicle according to claim 1,
wherein the new real-time operating condition includes charge station data defining power cost and capacity data, and charge station performance data accumulated during the discrete time interval.

7. The vehicle according to claim 1,
wherein the operating condition includes one or more of charge station, environment, and location data, vehicle data, and battery performance data.

8. A vehicle, comprising:
a controller, coupled to a battery and a communication unit, configured to periodically, in response to a charge signal, adjust a travel route, having an origin and final destination, to include charging at a charge waypoint along the travel route other than the origin and final destination according to an estimated optimal charge route and waypoint charge time received from a remote fleet server in response to periodic operating conditions generated and communicated to the remote fleet server to reduce the charge time, in response to one or more of a charge and travel route complete signal, generate and store an estimate error that includes an optimized travel route performance, and a difference between the estimated waypoint charge time and an actual charge time, and in response to the operating conditions and estimate error communicated to the remote fleet server by the communication unit, readjust the travel route according to an updated estimated travel route and waypoint charge time received by the communication unit from the remote fleet server.

9. The vehicle according to claim 8, comprising:

the controller further configured to generate the operating conditions to include:

environment and location data to incorporate geographic location, and ambient temperature, humidity, and atmospheric pressure, vehicle data to incorporate vehicle identification number and onboard diagnostic codes and data, vehicle power, and climate control profile, and battery performance data to include battery pack capacity and chemistry, battery state of health and charge, battery temperature, and charge station power and performance.

10. The vehicle according to claim 8, wherein the operating conditions include charge station data defining power cost and capacity data, and charge station performance data accumulated during a current charge event.

11. A method of controlling a vehicle, comprising:

by a controller coupled to a battery, periodically in response to a charge signal; adjusting a travel route, having an origin and final destination, to include charging at a charge waypoint along the travel route other than the origin and final destination according to an estimated optimal charge route and waypoint charge time received from a remote fleet server, and in response to periodic operating conditions generated and communicated to the remote fleet server such that travel route and charge time are optimized, in response to one or more of travel route and charge complete signals, generating and storing an estimate error that includes a travel route performance and a difference between the estimated waypoint charge time and an actual charge time, and in response to the estimate error and operating conditions communicated to the remote fleet server by a communication unit, readjusting the travel route according to an updated estimated optimal charge route and waypoint charge time received by the communication unit from the remote fleet server.

12. The method according to claim 11, further comprising:

by the controller, generating the operating conditions to include:

environment and location data to incorporate geographic location, and ambient temperature, humidity, and atmospheric pressure, vehicle data to incorporate vehicle identification number and onboard diagnostic codes and data, and vehicle power, and battery performance data to include battery pack capacity and chemistry, battery state of health and charge, battery temperature, charge station power and performance, and low voltage battery status.

13. The method according to claim 11, wherein the operating conditions include charge station data defining power cost and capacity data, and charge station performance data accumulated during a current charge event.

* * * * *